United States Patent
Otaki et al.

(10) Patent No.: US 8,273,431 B2
(45) Date of Patent: Sep. 25, 2012

(54) POLYAMIDE RESIN COMPOSITION

(75) Inventors: Ryoji Otaki, Kanagawa (JP); Jun Mitadera, Kanagawa (JP); Tomonori Kato, Kanagawa (JP); Tomomichi Kanda, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 614 days.

(21) Appl. No.: 12/302,335

(22) PCT Filed: May 31, 2007

(86) PCT No.: PCT/JP2007/061138
§ 371 (c)(1),
(2), (4) Date: Nov. 25, 2008

(87) PCT Pub. No.: WO2007/139200
PCT Pub. Date: Dec. 6, 2007

(65) Prior Publication Data
US 2009/0239013 A1  Sep. 24, 2009

(30) Foreign Application Priority Data

May 31, 2006 (JP) .................... 2006-151663
Aug. 30, 2006 (JP) .................... 2006-233467

(51) Int. Cl.
*B32B 1/02* (2006.01)
*B32B 1/08* (2006.01)

(52) U.S. Cl. ............ 428/36.6; 428/34.1; 428/34.2; 428/35.7; 428/35.9; 428/36.9; 524/606; 525/233; 525/284; 525/306; 525/321; 525/394; 525/424; 525/425

(58) Field of Classification Search .......... 428/34.1, 428/34.2, 35.7, 35.9, 36.6, 36.9; 524/606; 525/233, 284, 306, 321, 394, 424, 425
See application file for complete search history.

(56) References Cited

U.S. PATENT DOCUMENTS

| | | | |
|---|---|---|---|
| 3,872,055 A | 3/1975 | Furukawa et al. | |
| 6,515,058 B1 | 2/2003 | Tomiyama et al. | |
| 2003/0139497 A1* | 7/2003 | Odorisio et al. | 524/86 |

FOREIGN PATENT DOCUMENTS

| | | |
|---|---|---|
| EP | 0 542 512 A1 | 5/1993 |
| EP | 0 940 444 | 9/1999 |
| EP | 1 482 003 | 12/2004 |
| EP | 1 570 983 | 9/2005 |
| EP | 1 698 667 A1 | 9/2006 |
| JP | 49-045960 | 5/1974 |
| JP | 07-247422 | 9/1995 |
| JP | 10-147711 | 6/1998 |
| JP | 11-334006 | 12/1999 |
| JP | 2000-211665 | 8/2000 |
| JP | 2000-248176 | 9/2000 |
| JP | 2001-164109 | 6/2001 |
| JP | 2001-226585 | 8/2001 |
| JP | 2003-011307 | 1/2003 |
| JP | 2003-251775 | 9/2003 |
| JP | 2003-252986 | 9/2003 |
| JP | 2003-291938 | 10/2003 |
| JP | 2004-352833 | 12/2004 |
| JP | 2005-194328 | 7/2005 |
| JP | 2005-194329 | 7/2005 |

OTHER PUBLICATIONS

Chinese Official Action dated Nov. 22, 2010, for CN Application No. 200780015619.8.
Hirabe, et al. (of Nissei Plastic Injection), "What is Injection Molding", Defects Caused by Entrained Air, Jul. 1996, p. 197, lines 12-23.
Extended European Search Report for Application No. 07744526, dated Nov. 18, 2011.

* cited by examiner

*Primary Examiner* — Marc Patterson
(74) *Attorney, Agent, or Firm* — Antonelli, Terry, Stout & Kraus, LLP.

(57) ABSTRACT

A polyamide resin composition contains a resin component containing at least a polyamide (X) and a fatty acid metallic salt having from 10 to 50 carbon atoms, and contains arbitrarily an additive (A) and/or an additive (B). The polyamide (X) is obtained through melt polycondensation of a diamine component containing 70% by mol or more of m-xylylenediamine and a dicarboxylic acid component containing 70% by mol or more of an $\alpha,\omega$-linear aliphatic dicarboxylic acid. The additive (A) is at least one compound selected from the group consisting of a diamide compound obtained from a fatty acid having from 8 to 30 carbon atoms and a diamine having from 2 to 10 carbon atoms, a diester compound obtained from a fatty acid having from 8 to 30 carbon atoms and a diol having from 2 to 10 carbon atoms, and a surfactant, and the additive (B) is at least one compound selected from the group consisting of a metallic hydroxide, a metallic acetate salt, a metallic alkoxide, a metallic carbonate salt and a fatty acid.

24 Claims, No Drawings

POLYAMIDE RESIN COMPOSITION

TECHNICAL FIELD

The present invention relates to a resin composition that contains a polyamide having a m-xylylene group and, depending on necessity, another polyamide in the main chain thereof. More specifically, it relates to a polyamide resin composition that has favorable color tone, contains a less amount of gel, and can be subjected to melt extrusion process stably for a prolonged period of time.

BACKGROUND ART

A packaging material for foods, beverages and the like is demanded to have such functions as strength, resistance to cracking, heat resistance and the like for protecting the content from distribution, storage, such as refrigeration and the like, and treatments, such as thermal sterilization and the like, and also demanded to have a wide variety of functions, such as excellent transparency and the like for confirming the content. In recent years, furthermore, it is demanded to have oxygen barrier property for preventing oxygen from invading from the exterior for suppressing foods from being oxidized, carbon dioxide barrier property and barrier property against various kinds of aromatic components and the like.

A polyolefin, such as polyethylene, polypropylene and the like, a polyester, such as polyethylene terephthalate, and an aliphatic polyamide, such as nylon 6, have been used widely as a packaging material owing to good handleability and processability, and excellent transparency and mechanical properties of a sheet or film obtained therefrom. However, it is poor in barrier property against a gaseous substance, such as oxygen and the like, and thus has such problems that the content is liable to suffer oxidation degradation, and aromatic components and carbon dioxide are liable to penetrate therethrough to shorten the expiration period of the content.

A plastic container (such as a bottle) containing mainly a polyester, such as polyethylene terephthalate (PET) and the like, has been widely used for tea, fruit beverages, carbonated beverages and the like. The proportion of a small-size plastic bottle within the plastic containers is being increased year by year. The ratio of the surface area per unit volume of the content is increased by decreasing the size of the bottle, and therefore, there is a tendency of shortening the expiration period of the content when the size of the bottle is decreased. In recent years, furthermore, beer, which is liable to receive effects of oxygen and light, is sold in a plastic bottle, and tea in a plastic bottle is sold in a warmed state, which expand the application range of plastic containers. Under the circumstances, there is a demand of further enhancing the gas barrier property of a plastic container.

For enhancing the barrier property against a gaseous substance, such as oxygen, a film or the like formed by combining the aforementioned thermoplastic resins with a gas barrier resin, such as vinylidene chloride, an ethylene-vinyl alcohol copolymer, polyvinyl alcohol and the like, is used. However, a film containing vinylidene chloride is excellent in gas barrier property irrespective of the storage conditions, but has such a problem that it generates dioxin through combustion to contaminate the environments. An ethylene-vinyl alcohol copolymer and polyvinyl alcohol are free of the before-mentioned problem of environmental contamination. However, a film formed therefrom exhibits excellent gas barrier property under an environment of a relatively low temperature, but there is a tendency of decreasing the gas barrier property considerably in the case where the content to be kept has a high water activity or is kept under a high humidity environment, or the film is subjected to a thermal sterilization treatment after charging the content, whereby there may be a problem in storage stability of the content.

As a material excellent in gas barrier property, a polyamide containing a m-xylylene group in the main chain thereof obtained through polycondensation reaction of m-xylylenediamine and an aliphatic dicarboxylic acid, such as polyamide MXD6 obtained from m-xylylenediamine and adipic acid, has been known. The m-xylylenediamine group-containing polyamide is used widely as engineering plastics owing to the high rigidity and excellent thermal property and molding processability. It exhibits high barrier property against a gaseous substance, such as oxygen or carbon dioxide gas and the like, owing to the m-xylylene group in the polymer main chain, and is used as a gas barrier material for various packaging materials, such as a film, a bottle, a sheet and the like, by combining with various resins, such as polyethylene terephthalate and the like. However, upon molding the m-xylylene group-containing polyamide into a film, a sheet, a bottle and the like, air may be entrained upon melt processing to form bubbles, or appearance failure, such as silver stripes, uneven flows and the like, may occur unless the molding conditions, such as the screw shape, the temperature, the back pressure and the like, are properly set. In the case where a large amount of powder is contained in the pellets, particularly, there is a tendency that these phenomena may often occur, and there is a demand of improvement.

For preventing entrainment of air from occurring in molding process, in general, it has been necessary to provide such measures that the lower side of the hopper is cooled to decrease the temperature of the cylinder of the extruder, the rotation number of the screw is lowered, the back pressure is increased in the case of injection molding, and the like (see Non-patent Document 1), but even though these measures are made, there are cases where entrainment of air cannot be sufficiently prevented from occurring due to the defective shape of the screw, and there is a problem of deterioration in yield of products.

A polyamide resin composition excellent in extrusion property that suffers less unevenness in ejection and can lowers the extrusion force upon melt extrusion molding has been disclosed (see Patent Document 1). Although the technique can improve the extrusion property upon extrusion molding, there are cases where entrainment of air cannot be prevented from occurring depending on the shape of the screw. Furthermore, there is no study relating to injection molding.

Since a m-xylylene group-containing polyamide has crystallinity, there are cases where it is whitened due to crystallization immediately after molding to lower the transparency of the resulting product unless molding conditions such as an extrusion temperature, a cooling temperature and a cooling time are properly set. For preventing the whitening due to crystallization immediately after molding, a certain degree of improvement can be obtained by decreasing the cooling temperature or prolonging the cooling time, but the measures provide a problem of deterioration in economy due to the prolonged cycle time. Furthermore, in such an apparatus that the cooling temperature cannot be sufficiently lowered, or the cooling time cannot be prolonged, due to the specification of the apparatus, the m-xylylene group-containing polyamide cannot be used.

A polyamide molded article containing solid phase polymerization polyamide MXD6 that suffers less whitening upon storing under a high humidity, upon making into contact with water or boiling water, or upon heating to a temperature of the glass transition temperature or higher is disclosed (see Patent Document 2), but there is no study relating to prevention of crystallization immediately after molding, and a polyamide that is not formed by solid phase polymerization.

In a m-xylylene group-containing polyamide, carbon at the α-position of the benzene ring (benzyl carbon) is liable to be a radical, and thus it is poor in thermal stability as compared to a polyamide, such as nylon 6. Accordingly, various proposals have been made relating to improvement in thermal stability upon production or extrusion molding process.

For example, for producing a m-xylylene group-containing polyamide having a less amount of gel, it is important to execute polycondensation in such a manner that the intended molecular weight is quickly obtained while reducing the thermal history as much as possible. For reducing the thermal history, it is effective to execute the amidation reaction quickly by adding a compound having a catalytic effect into the polycondensation system.

As the compound that catalyzes the amidation reaction, a phosphorus atom-containing compound has been widely known. Such a method has been previously proposed that polycondensation for producing a polyamide is carried out in the presence of a phosphorus atom-containing compound and an alkali metal compound (see, for example, Patent Document 3). The phosphorus atom-containing compound not only accelerates the amidation reaction, but also functions as an antioxidant that prevents coloration of the polyamide due to oxygen present in the polycondensation system, and therefore a polyamide having a less amount of gel and having a low yellowness degree can be obtained. However, the compound may bring about formation of a three-dimensional structure (gelation) in some cases, and thus a suitable addition amount is necessarily selected.

In the case where a polyamide having a phosphorus atom-containing compound added in the polycondensation step is remelted and molded in an extruder or the like, however, there are cases where the resin pressure is gradually increased to fail to execute stable operation. As a result of research on the reasons therefor by the inventors, it has been found that the phosphorus atom-containing compound contained in the polyamide at the filter mounted on the discharge port of the extruder is denatured and deposited to clog the filter by attaching thereto.

Such a method has been proposed to prevent clogging of the filter by decreasing the addition amount of the phosphorus atom-containing compound, the alkali metal compound and the like added to the polyamide (see, for example, Patent Document 4). However, this method is different from the present invention, which pays attention to denaturation of the phosphorus atom-containing compound. In this method, furthermore, since the addition amount of the phosphorus atom-containing compound for preventing coloration of the polyamide is small, the resulting polyamide is colored yellow and has a low utility value as a packaging material.

A method for preventing gelation of a polyamide by adding from 0.0005 to 0.5 part by weight of at least one kind selected from a lubricant, an organic phosphorus stabilizer, a hindered phenol compound and a hindered amine compound upon molding a polyamide has been proposed (see, for example, Patent Document 5). However, this method relates to prevention of gelation of the polyamide due to the thermal history during molding process, but there is no disclosure relating to clogging of the filter ascribable to denaturation of the phosphorus atom-containing compound in the polyamide.

A m-xylylene group-containing polyamide has various problems upon applying as it is to a purpose that requires flexibility, such as a film and the like, due to the considerably high rigidity thereof. For improving the property, various proposals for satisfying both the gas barrier property and the flexibility have been made by melt-mixing an ordinary polyamide excellent in flexibility, such as nylon 6, nylon 666 and the like, with the m-xylylene group-containing polyamide, or by forming a multi-layer structure therewith (see, for example, Patent Documents 6 to 8).

However, when the m-xylylene group-containing polyamide is mixed with another nylon, there are cases where the melt viscosity is increased far beyond the value that is expected from the arithmetic average. As a measure for preventing the phenomenon, it has been proposed that the difference in concentration between the end carboxyl group and the end amino group in the polyamide resin composition after melt-mixing has a particular relationship to the concentration of the phosphorus atom contained in the polyamide resin composition after melt-mixing (see, for example, Patent Document 9). In this method, for suppressing the amidation from proceeding in the molten state, the balance of the end groups of the polyamide is set to make one of them excessive, or the amount of the phosphorus compound capable of functioning as an amidation catalyst is decreased, whereby the increase in melt viscosity due to increase of the molecular weight is prevented from occurring. Upon production of a polyamide used for a packaging material and the like, however, a sufficient polymerization degree cannot be obtained unless the reaction molar ratio between the diamine component and the dicarboxylic acid is made close to 1 as much as possible. Accordingly, in this method, it is practically necessary to decrease the concentration of the phosphorus atom in the polyamide to a low level. In the case where the concentration of the phosphorus atom in the polymerization system is low, the polymerization reaction time for providing a sufficient molecular weight is prolonged, and the resulting polyamide has an increased yellowness degree and contains a large amount of gel due to oxidation of the polymer, whereby the products obtained by the method, such as a packaging material and the like, are poor in commercial value consequently.

The inventors have found that the melt viscosity of the melt-mixed product of the m-xylylene group-containing polyamide and another nylon varies in some cases depending on the production history, the storage condition, the storage period and the like of the m-xylylene group-containing polyamide even though the melt viscosities, the phosphorus atom concentrations, the end group concentrations and the like of the starting materials are the same. The problem, which is not disclosed not only in Patent Document 9 but also in any document, is necessarily resolved from the standpoint of extrusion process stability.

[Patent Document 1] JP-A-10-147711
[Patent Document 2] JP-A-2000-248176
[Patent Document 3] JP-A-49-45960
[Patent Document 4] JP-A-2005-194328
[Patent Document 5] JP-A-2001-164109
[Patent Document 6] JP-A-11-334006
[Patent Document 7] JP-A-2000-211665
[Patent Document 8] JP-A-2003-011307
[Patent Document 9] JP-A-7-247422
[Non-patent Document 1] "Shiritai Shashutsu Seikei" (Learning Injection Molding), published by Japan Machinist Co., Ltd.

DISCLOSURE OF THE INVENTION

An object of the present invention is to solve the aforementioned problems and to provide a polyamide resin composition that contains a polyamide containing a m-xylylene group and, depending on necessity, another polyamide, and has a less amount of gel, suffers less coloration, and can be stably subjected to molding process for a prolonged period of time. Another object of the present invention is to provide a polyamide resin composition excellent in molding processability and productivity that suffers less influence of molding conditions, such as a screw shape and the like, and generates no bubble not only on extrusion molding but also on injection molding. Still another object of the present invention is to provide a polyamide resin composition that has good barrier property under a high humidity condition, and suffers no whitening due to crystallization immediately after molding, thereby providing a molded article excellent in transparency.

As a result of earnest investigations made by the inventors, the inventors have been found that a polyamide resin composition containing a m-xylylene group-containing polyamide obtained through polycondensation in the presence of a phosphorus atom-containing compound mixed with a fatty acid metallic salt and, depending on necessity, another additive causes no clogging of a filter to enable stable continuous operation for a prolonged period of time, provides a molded article with good appearance that suffers less gelation and coloration, is excellent in molding processability and productivity, and provides a molded article that is excellent in transparency and gas barrier property under a high humidity condition. Furthermore, the inventors have found that a polyamide resin composition containing a m-xylylene group-containing polyamide obtained through polycondensation in the presence of a phosphorus atom-containing compound mixed with a fatty acid metallic salt and, depending on necessity, another additive shows no abnormal increase of the melt viscosity to enable stable continuous operation for a prolonged period of time, and provides a molded article with good appearance that suffers less gelation and coloration. The present invention is based on these findings.

Accordingly, the present invention relates to a polyamide resin composition that contains a resin component containing a polyamide (X) obtained through melt polycondensation of a diamine component containing 70% by mol or more of m-xylylenediamine and a dicarboxylic acid component containing 70% by mol or more of an $\alpha,\omega$-linear aliphatic dicarboxylic acid, and a fatty acid metallic salt having from 10 to 50 carbon atoms, and arbitrarily contains an additive (A) and/or an additive (B), the additive (A) being at least one compound selected from the group consisting of a diamide compound obtained from a fatty acid having from 8 to 30 carbon atoms and a diamine having from 2 to 10 carbon atoms, a diester compound obtained from a fatty acid having from 8 to 30 carbon atoms and a diol having from 2 to 10 carbon atoms, and a surfactant, and the additive (B) being at least one compound selected from the group consisting of a metallic hydroxide, a metallic acetate salt, a metallic alkoxide, a metallic carbonate salt and a fatty acid.

BEST MODE FOR CARRYING OUT THE INVENTION

The polyamide resin composition of the present invention contains a resin component containing a polyamide (X), which is obtained through polycondensation of a diamine component containing 70% by mol or more of m-xylylenediamine and a dicarboxylic acid component containing 70% by mol or more of an $\alpha,\omega$-linear aliphatic dicarboxylic acid, a fatty acid metallic salt having from 10 to 50 carbon atoms, and depending on necessity an additive (A) and/or an additive (B).

The diamine component constituting the polyamide (X) preferably contains m-xylylenediamine in an amount of 70% by mol or more, more preferably 75% by mol or more, further preferably 80% by mol or more, and particularly preferably 90% by mol or more (including 100% by mol). In the case where the amount of m-xylylenediamine in the diamine component is 70% by mol or more, the resulting polyamide exhibits excellent gas barrier property. Examples of a diamine other than m-xylylene diamine include an aliphatic diamine, such as tetramethylenediamine, pentamethylenediamine, 2-methyl-1,5-pentanediamine, hexamethylenediamine, heptamethylenediamine, octamethylenediamine, nonamethylenediamine, decamethylenediamine, dodecamethylenediamine, 2,2,4-trimethylhexamethylenediamine, 2,4,4-trimethylhexamethylenediamine and the like; an alicyclic diamine, such as 1,3-bis(aminomethyl)cyclohexane, 1,4-bis(aminomethyl) cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, bis (aminomethyl)tricyclodecane and the like; a diamine having an aromatic ring, such as bis(4-aminophenyl)ether, p-phenylenediamine, p-xylylenediamine, bis(aminomethyl)naphthalene and the like, but it is not limited thereto.

The dicarboxylic acid component constituting the polyamide (X) preferably contains an $\alpha,\omega$-linear aliphatic dicarboxylic acid in an amount of 70% by mol or more, more preferably 75% by mol or more, further preferably 80% by mol or more, and particularly preferably 90% by mol or more (including 100% by mol). In the case where the amount of the $\alpha,\omega$-linear aliphatic dicarboxylic acid is 70% by mol or more, decrease of the gas barrier property and excessive decrease of the crystallinity can be prevented. The $\alpha,\omega$-linear aliphatic dicarboxylic acid is preferably at least one $\alpha,\omega$-linear aliphatic dicarboxylic acid having from 4 to 20 carbon atoms selected from succinic acid, glutaric acid, pimelic acid, adipic acid, sebacic acid, suberic acid, azelaic acid, undecanedioic acid, dodecanedioic acid, dimer acid and the like, and adipic acid is particularly preferred. Examples of the other dicarboxylic acid component include an alicyclic dicarboxylic acid, such as 1,4-cyclohexanedicarboxylic acid and the like, and an aromatic dicarboxylic acid, such as terephthalic acid, isophthalic acid, orthophthalic acid, xylylenedicarboxylic acid, naphthalenedicarboxylic acid and the like. In the case where the dicarboxylic acid component contains isophthalic acid in an amount of from 1 to 20% by mol, and more preferably from 3 to 10% by mol, whitening immediately after molding can be further suppressed.

In addition to the diamine component and the dicarboxylic acid component mentioned above, as a component constituting the polyamide (X), a lactam, such as $\epsilon$-caprolactam, laurolactam and the like, an aliphatic aminocarboxylic acid, such as aminocaproic acid, aminoundecanoic acid and the like, an aromatic aminocarboxylic acid, such as p-aminomethylbenzoic acid and the like, and the lime may be used as a copolymerization component in such a range that does not impair the advantages of the invention.

The polyamide (X) is preferably produced by a melt polycondensation (melt polymerization) method in the presence of a phosphorus atom-containing compound. Examples of the melt polycondensation method include such a method that a nylon salt containing a diamine component and a dicarboxylic acid component is heated under pressure in the presence of water to polymerize in a molten state while removing the added water and condensation water. It can also be produced by a method of polycondensation by adding a diamine component directly into a dicarboxylic acid component in a molten state. In this case, for maintaining the reaction system to a homogeneous liquid state, the diamine component is added continuously to the dicarboxylic acid component, during which the polycondensation is carried out while heating the reaction system to prevent the temperature thereof from becoming lower than the melting points of the oligoamide and the polyamide formed.

Examples of the phosphorus atom-containing compound include dimethylphosphinic acid, phenylmethylphosphinic acid, hypophosphorous acid, sodium hypophosphite, potassium hypophosphite, lithium hypophosphite, ethyl hypophosphite, phenylphosphonous acid, sodium phenylphosphonoate, potassium phenylphosphonoate, lithium phenylphosphonoate, ethyl phenylphosphonoate, phenylphosphonic acid, ethyl phosphonic acid, sodium phenylphosphonate, potassium phenylphosphonate, lithium phenylphosphonate, diethyl phenylphosphonate, sodium ethylphosphonate, potassium ethylphosphonate, phosphorous acid, sodium hydrogen phosphite, sodium phosphite, triethyl phosphite, triphenyl phosphite, pyrrophosphorous acid and the like, and among these, a metallic hypophosphite salt, such as sodium hypophosphite, potassium hypophosphite, lithium hypophosphite and the like, are preferably used owing to the excellent coloration preventing effect thereof, with sodium hypophosphite being particularly preferred. The phosphorus atom-containing compound capable of being used in the present invention is not limited to these compounds.

The addition amount of the phosphorus atom-containing compound is preferably from 50 to 400 ppm, more preferably from 60 to 350 ppm, and further preferably from 70 to 300 ppm, in terms of the phosphorus atom concentration in the polyamide (X). In the case where the addition amount is in the range, the polyamide is prevented from being colored during polymerization, gelation reaction of the polyamide is suppressed, and a fish-eye, which is considered to be ascribable to the phosphorus atom-containing compound, can be prevented from being formed, thereby improving the appearance of the resulting molded article.

The polycondensation for producing the polyamide (X) is preferably carried out in the presence of an alkali metal compound (C) in addition to the phosphorus atom-containing compound. A sufficient amount of the phosphorus atom-containing compound is necessarily made present for preventing coloration of the polyamide during polycondensation, which may bring about gelation of the polyamide in some cases, and therefore, an alkali metal compound (C) is preferably made present for controlling the amidation reaction rate. As the alkali metal compound (C), an alkali metal hydroxide and an alkali metal acetate salt are preferred. Examples of the alkali metal compound (C) include lithium hydroxide, sodium hydroxide, potassium hydroxide, rubidium hydroxide, cesium hydroxide, lithium acetate, sodium acetate, potassium acetate, rubidium acetate, cesium acetate and the like, but it is not limited to these compounds.

In the case where the polycondensation for producing the polyamide (X) is carried out in the presence of the alkali metal compound (C), the ratio (molar number of the alkali metal compound (C))/(molar number of the phosphorus atom-containing compound) is preferably from 0.5 to 1, more preferably from 0.55 to 0.95, and further preferably from 0.6 to 0.9. In the case where the ratio is in the range, the moderate effect of suppressing the acceleration of the amidation reaction by the phosphorus atom-containing compound can be obtained, and therefore, such a phenomenon can be avoided that the reaction is excessively suppressed to lower the polycondensation reaction rate, whereby the thermal history of the polyamide is increased to increase gelation of the polyamide.

The polyamide (X) obtained through polycondensation is once taken out and formed into pellets, which are used after drying. It may be subjected to solid phase polymerization for further increasing the polymerization degree. As a heating apparatus for drying and solid phase polymerization, a continuous heating and drying apparatus, a rotation drum type heating apparatus, such as a tumbling dryer, a conical dryer, a rotary dryer and the like, and a cone-shaped heating apparatus having rotary blades inside, which is referred to as Nauta mixer, are preferably used, but it is not limited thereto, and known methods and apparatuses may be used. In the case where solid phase polymerization of the polyamide is carried out, in particular, a batchwise heating apparatus is preferably used since the system can be sealed, whereby polycondensation can be carried out in a state where oxygen causing coloration is avoided.

The polyamide (X) obtained through the aforementioned process suffers less coloration and gelation, and in the present invention, among the polyamides obtained through the aforementioned process, one having a b* value in the color difference test of JIS K7105 of 3 or less is preferably used, particularly preferably 2 or less, and further preferably 1 or less. The polyamide having a b* value exceeding 3 is not preferred since it provides a molded article obtained through post processing having strong yellowness, which deteriorates the commercial value thereof.

A relative viscosity is ordinarily used as an index of the polymerization degree of the polyamide (X). The relative viscosity of the polyamide (X) is preferably from 1.5 to 4.2, more preferably from 1.7 to 4.0, and further preferably from 2.0 to 3.8. In the case where the polyamide (X) has a relative viscosity of 1.5 or more, the molten polyamide has stable flowability to provide a molded article excellent in appearance. In the case where the polyamide (X) has a relative viscosity of 4.2 or less, the polyamide has a suitable relative viscosity to execute the molding process stably. The relative viscosity referred herein is a ratio of the drop time (t) of a solution of 1 g of the polyamide dissolved in 100 mL of 96% sulfuric acid measured with a Cannon-Fenske viscometer at 25° C. to the drop time (t0) of 96% sulfuric acid itself measured in the same manner, and can be calculated from the following expression.

$$\text{Relative viscosity} = t/t0$$

The number average molecular weight of the polyamide (X) is preferably from 6,000 to 50,000, and more preferably from 10,000 to 45,000. In the case where the number average molecular weight is in the range, favorable heat resistance and molding processability can be obtained.

The amount of melting heat of the polyamide (X) is preferably from 30 to 70 J/g. In the case where the amount of melting heat is in the range, the polyamide resin composition can be easily melted in an extruder, and the possibility of entraining air upon melting is lowered, and favorable productivity and molding processability can be obtained.

The glass transition temperature (Tgm) of the polyamide (X) is preferably from 70 to 100° C. In the case where the glass transition temperature is in the range, the polyamide resin composition can be easily melted in an extruder, and the possibility of entraining air upon melting is lowered, whereby favorable productivity and molding processability can be obtained.

The degree of crystallinity of the polyamide (X) is preferably from 10 to 40%. In the case where the degree of crystallinity is in the range, the polyamide resin composition can be easily melted in an extruder, and the possibility of entraining air upon melting is lowered, whereby favorable productivity and molding processability can be obtained. In the case where the degree of crystallinity is too low, air is liable to be entrained, and in the case where the degree of crystallinity is too high, a prolonged period of time is required for melting, and the moldability may be deteriorated in some cases. Furthermore, whitening immediately after molding can be suppressed.

The half crystallization time of the polyamide (X) at 160° C. is preferably from 10 to 1,600 s, more preferably from 15 to 1,000 s, and further preferably from 20 to 500 s. In the case where the half crystallization time is in the range, the polyamide resin composition can be easily melted in an extruder, and the possibility of entraining air upon melting is lowered, whereby favorable productivity and molding processability can be obtained. Furthermore, whitening immediately after molding can be suppressed.

The melting point of the polyamide (X) is preferably from 200 to 265° C. In the case where the melting point is in the range, the polyamide resin composition can be easily melted in an extruder, and the possibility of entraining air upon melting is lowered, whereby favorable productivity and molding processability can be obtained.

The melting point, the amount of melting heat and the glass transition temperature were measured by the DSC (differential scanning calorimeter measurement) method. DSC-50, produced by Shimadzu Corporation, was used, and about 5 mg of a sample was heated from room temperature to 300° C. at a temperature increasing rate of 10° C. per minute. As the atmospheric gas, nitrogen was fed at 30 mL/min. As the glass transition temperature, the so-called median point temperature (Tgm) was used. Tgm is the median point temperature of two intersecting points of the tangent lines of the base lines of the glass state and the supercooled state (rubber state) and the tangent line of the slope showing the transition state. The degree of crystallinity was calculated by using the amount of crystallization heat and the amount of melting heat obtained by the DSC method. The half crystallization time was obtained by the depolarization intensity method. The polyamide (X) was melt-extruded from an extruder through a T-die at from 240 to 270° C. The resulting sheet having a thickness of about from 100 to 200 μm was held with two glass plates and melted in an air bath at 280° C. for 3 minutes, and then the sheet was placed in an oil bath at 160° C. and measured for depolarization transmitted light intensity. As an apparatus therefor, for example, one produced by Kotaki Manufacturing Co., Ltd. (polymer crystallization rate measuring apparatus, MK-701) and the like can be used.

The polyamide (X) may contain additives, such as a matting agent, a heat resistant stabilizer, a weather resistant stabilizer, an ultraviolet ray absorbent, a nucleating agent, a plasticizer, a flame retardant, an antistatic agent, a coloration preventing agent, a gelation preventing agent and the like, various organic compounds for sealing the ends, clay, such as bedded silicate and the like, a nanofiller and the like, but it is not limited to those described above, and various materials may be added during polymerization and after polymerization.

A molded article obtained by molding the polyamide (X) as it is excellent in appearance without coloration and gelation, but there may be some cases where a filter, which is generally provided in the molding apparatus for removing foreign matters, is clogged to increase the resin pressure, whereby the quality of the product may be fluctuated, and operation of the apparatus is necessarily stopped within a short period of time to deteriorate the production efficiency. This is because the phosphorus atom-containing compound remaining in the polyamide (X) is denatured and deposited through the thermal history to clog the filter.

The resin component of the polyamide resin composition of the present invention may be the polyamide (X) solely or may contain a polyamide (Y) in addition to the polyamide (X).

As the polyamide (Y), a polyamide that does not contain a m-xylylenediamine unit is used. Examples thereof include an aliphatic polyamide, such as nylon 6, nylon 66, nylon 666, nylon 46, nylon 610, nylon 612 and the like, a semi-aromatic polyamide, such as nylon 6T, nylon 6I, nylon 6IT, nylon 9T, nylon 66I and the like, and a copolymer thereof, which may be selected depending on purpose. As the polyamide (Y), one of those described above may be used, and two or more of them may be used after mixing depending on purpose. For example, in the case where flexibility is demanded, nylon 6 and nylon 666 are preferably mixed. For increasing the crystallization rate of the polyamide (X), a crystalline polyamide, such as nylon 6, nylon 66 and the like, is preferably mixed, and for decreasing the same, a non-crystalline or hardly crystalline polyamide, such as nylon 6IT and the like, is preferably mixed.

The polyamide (Y) is produced by the melt polycondensation (melt polymerization) method. In the polycondensation of the polyamide (Y), the phosphorus atom-containing compound may be added for increasing the amidation reaction rate. Furthermore, for increasing the polymerization degree, it may be subjected to solid phase polymerization as similar to the polyamide (X).

The polymerization degree of the polyamide (Y) is preferably selected with the melt viscosity at the temperature, at which it is melted and mixed with the polyamide (X), as an index. Upon mixing the polyamide (X) and the polyamide (Y), the morphology thereof forms a sea-island structure, in which there is a tendency that a smaller dispersed particle diameter of the island part provides a composition having excellent characteristics. Specifically, upon mixing the polyamide (X) and the polyamide (Y), it is preferred that the melt viscosity of the large amount component is larger than the melt viscosity of the small amount component, and it is more preferred that the melt viscosity of the large amount component is 1.2 times or more, and further preferably 1.5 times or more, the melt viscosity of the small amount component.

The melt viscosity of the polyamide resin composition at 270° C. and a shear rate of 100 s$^{-1}$ is preferably 1.20 times or less, more preferably from 1 to 1.20 times, and further preferably from 1 to 1.15 times, the arithmetic average value obtained by the following expression (1):

$$MVA=MV1/(W1/100)+MV2/(W2/100) \qquad (1)$$

(In the expression, MVA represents the arithmetic average value of the melt viscosity (Pa·s);

MV1 represents the melt viscosity (Pa·s) of the polyamide (X) at 270° C. and a shear rate of 100 s$^{-1}$;

MV2 represents the melt viscosity (Pa·s) of the polyamide (Y) at 270° C. and a shear rate of 100 s$^{-1}$;

W1 represents the weight ratio (% by weight) of the polyamide (X) in the polyamide resin composition; and W2 represents the weight ratio (% by weight) of the polyamide (Y) in the polyamide resin composition.)

The polyamide (Y) may contain additives, such as a matting agent, a heat resistant stabilizer, a weather resistant stabilizer, an ultraviolet ray absorbent, a nucleating agent, a plasticizer, a flame retardant, an antistatic agent, a coloration preventing agent, a gelation preventing agent and the like, various organic compounds for sealing the ends, clay, such as bedded silicate and the like, a nanofiller and the like, but it is not limited to those described above, and various materials may be added during polymerization and after polymerization.

The mixing ratio of the polyamide (X) and the polyamide (Y) is preferably (polyamide (X))/(polyamide (Y)) of (from 1 to 99)/(from 99 to 1) (% by weight with 100% by weight in total), more preferably (from 5 to 95)/(from 95 to 5), and further preferably (from 10 to 90)/(from 90 to 10). In the case where the ratio is in the range, the modification effect by mixing the polyamide (X) and the polyamide (Y) can be sufficiently obtained.

In the present invention, for improving molding processability and preventing denaturation of the phosphorus atom-containing compound occurring in the molding process to prevent the melt viscosity from being largely increased, a fatty acid metallic salt and, depending on necessity an additive (A) and/or an additive (B) are added to the polyamide (X) or a mixture of the polyamide (X) and the polyamide (Y). In the case where the fatty acid metallic salt and the additive (A) arbitrarily added are present in the melted polyamide (X) or mixture of the polyamide (X) and the polyamide (Y), the molding processability is particularly improved. In the case where the fatty acid metallic salt and the arbitrary additive (B) are present in the melted polyamide (X), denaturation of the phosphorus atom-containing compound, which causes clogging of the filter, can be particularly suppressed. In the case where the fatty acid metallic salt and the arbitrary additive (B) are present in the melted mixture of the polyamide (X) and the polyamide (Y), the melt viscosity can be particularly prevented from being largely increased.

The carbon number of the fatty acid constituting the fatty acid metallic salt is from 10 to 50, and more preferably 18 to 34. The fatty acid may contain a side chain and a double bond, and is preferably a linear saturated fatty acid, such as stearic acid (C18), eicosanoic acid (C20), behenic acid (C22), montanic acid (C28), triacontanoic acid (C30) and the like. Examples of the metal constituting the salt with the fatty acid include sodium, potassium, lithium, calcium, barium, magnesium, strontium, aluminum, zinc, cobalt and the like, and sodium, potassium, lithium, calcium, aluminum and zinc are preferred. The fatty acid metallic salt may be one of those described above or may be used in combination of two or more of them. The fatty acid metallic salt is excellent in handleability as compared to hydroxides and acetate salts, and among these, a stearate metallic salt, particularly calcium stearate, is preferred since it is inexpensive and has a function of lubricant capable of further stabilizing the molding process.

The addition amount of the fatty acid metallic salt is preferably from 50 to 5,000 ppm, more preferably from 100 to 3,000 ppm, and further preferably from 100 to 1,000 ppm, in the polyamide resin composition. In the case where the addition amount is in the range, high effects of prevention of air entrainment and prevention of whitening can be obtained to improve productivity and molding processability.

The additive (A) is at least one compound selected from the group consisting of a diamide compound, a diester compound and a surfactant.

The diamide compound is obtained from a fatty acid having from 8 to 30 carbon atoms and a diamine having from 2 to 10 carbon atoms. In the case where the carbon number of the fatty acid is 8 or more, and the carbon number of the diamine is 2 or more, whitening prevention effect can be expected. In the case where the carbon number of the fatty acid is 30 or less, and the carbon number of the diamine is 10 or less, the polyamide resin composition attains favorable homogeneous dispersion. The fatty acid may have a side chain or a double bond, and is preferably a linear saturated fatty acid, such as stearic acid (C18), eicosanoicacid (C20), behenic acid (C22), montanic acid (C28), triacontanoic acid (C30) and the like. Examples of the diamine include ethylenediamine, butylenediamine, hexanediamine, xylylenediamine, bis(aminomethyl)cyclohexane and the like. A diamide compound obtained from a fatty acid having from 8 to 30 carbon atoms and a diamine mainly containing ethylene diamine, and a diamide compound obtained from a fatty acid mainly containing montanic acid and a diamine having from 2 to 10 carbon atoms are preferred. Among these, ethylenebisstearylamide is particularly preferred.

The diester compound is obtained from a fatty acid having from 8 to 30 carbon atoms and a diol having from 2 to 10 carbon atoms. In the case where the carbon number of the fatty acid is 8 or more, and the carbon number of the diol is 2 or more, whitening prevention effect can be expected. In the case where the carbon number of the fatty acid is 30 or less, and the carbon number of the diol is 10 or less, the polyamide resin composition attains favorable homogeneous dispersion. The fatty acid may have a side chain or a double bond, and is preferably a linear saturated fatty acid, such as stearic acid (C18), eicosanoicacid (C20), behenic acid (C22), montanic acid (C28), triacontanoic acid (C30) and the like. Examples of the diol include ethylene glycol, propanediol, butanediol, hexanediol, xylylene glycol, cyclohexanedimethanol and the like. A diester compound obtained from a fatty acid mainly containing montanic acid and a diol mainly containing ethylene glycol and 1,3-butanediol is particularly preferred.

The surfactant is selected from a nonionic surfactant, an anionic surfactant and a cationic surfactant. Examples of the nonionic surfactant include a polyethylene glycol surfactant of an ester type, an ether type and an alkylphenol type, a polyhydric alcohol partial ester surfactant of a sorbitan ester type, an ester ether surfactant of a polyoxyethylenesorbintan ester type, and the like, and it is not limited thereto. In the present invention, polyoxyethylenesorbitan monolaurate, which is one kind of an ester ether surfactant of a polyoxyethylenesorbintan ester type, is preferably used since it has particularly excellent air entrainment prevention effect and whitening prevention effect. The kinematic eddy viscosity of the nonionic surfactant is preferably about from 200 to 1,000 $mm^2/s$, and more preferably about from 250 to 500 $mm^2/s$, at 25° C. In the case where the kinematic eddy viscosity is in the range, favorable dispersibility and high air entrainment prevention effect are obtained to improve productivity and molding processability.

The additive (A) may be used solely or in combination of two or more kinds thereof. In the case where the diamide compound and/or the diester compound are used as the additive (A), the addition amount thereof is preferably from 50 to 1,000 ppm, more preferably from 100 to 800 ppm, and particularly preferably from 200 to 500 ppm, in the polyamide resin composition. In the case where the addition amount is in the range, high air entrainment prevention effect and whitening prevention effect are obtained to improve productivity and molding processability. In the case where the surfactant is used as the additive (A), the addition amount thereof is preferably from 50 to 500 ppm, and more preferably from 70 to 250 ppm, in the polyamide resin composition. In the case where the addition amount is in the range, high air entrainment prevention effect and whitening prevention effect are obtained to improve productivity and molding processability. In the case where the fatty acid metallic salt and the surfactant are used in combination, the addition amounts thereof are preferably from 100 to 1,000 ppm for the fatty acid metallic salt and from 50 to 200 ppm for the surfactant, and more preferably from 200 to 500 ppm for the fatty acid metallic salt and from 70 to 150 ppm for the surfactant, in the polyamide resin composition. As the additive (A), the nonionic surfactant is preferred, combination use of the fatty acid metallic salt is more preferred, and combination use of calcium stearate and polyoxyethylenesorbitan monolaurate is further preferred.

Examples of the additive (B) include a metallic hydroxide, such as lithium hydroxide, sodium hydroxide, potassium hydroxide, rubidium hydroxide, cesium hydroxide and the like; a metallic acetate salt, such as lithium acetate, sodium acetate, potassium acetate, rubidium acetate, cesium acetate and the like; a metallic alkoxide, such as sodium methoxide, sodium ethoxide, sodium propoxide, sodium butoxide, potassium methoxide, lithium methoxide and the like; a metallic carbonate salt, such as sodium carbonate and the like; a fatty acid; and the like, but it is not limited thereto.

The additive (B) encompasses the same compounds as the alkali metal compound (C) capable of being added during the polycondensation reaction for producing the polyamide (X), but it is considered that the alkali metal compound (C) is ionized in the polycondensation system, and the anions (such as OH⁻ and $CH_3COO^-$) formed from the alkali metal compound (C) in the dehydration step for executing the polycondensation reaction become water or acetic acid or are discharged along with water, whereby the alkali metal compound (C) is not present in the original form. Accordingly, it is expected that the alkali metal compound (C), which is added upon producing the polyamide (X), cannot attain the function of preventing the phosphorus atom-containing compound from being denatured upon molding. In the present invention, an alkali metal compound that is added during the polycondensation reaction is referred to as the alkali metal compound (C), which is distinguished from an alkali metal compound that is added as the additive (B).

The addition amounts of the fatty acid metallic salt and the arbitrary additive (B) are preferably such amounts that provide a ratio represented by the expression:

$$M1/M2$$

(in the expression, M1 represents the total molar number of the fatty acid metallic salt and the additive (B) in the polyamide resin composition, and M2 represents the molar number of the phosphorus atom-containing compound used in the polycondensation for producing the polyamide (X) in the polyamide resin composition) in a range of from 0.05 to 0.5, more preferably from 0.07 to 0.4, and further preferably from 0.1 to 0.3. In the case where the ratio is 0.05 or more, the phosphorus atom-containing compound can be prevented from being denatured to prevent clogging of the filter. In the case where the ratio is 0.5 or less, the polyamide (X) can be prevented from being decomposed and colored during molding. The addition amount of the fatty acid metallic salt has been described above. In the case where the addition amount is in the range, the polyamide resin composition can be stably processed.

In the case where the resin component contains the polyamide (X) and the polyamide (Y), the addition amounts of the fatty acid metallic salt and the additive (B) are preferably such amounts that provide a ratio represented by the expression:

$$M3/M4$$

(in the expression, M3 represents the total molar number of the fatty acid metallic salt and the additive (B) in the polyamide resin composition, and M4 represents the total molar number of the phosphorus atom-containing compound used in the polycondensation for producing the polyamide (X) and the phosphorus atom-containing compound used in the polycondensation for producing the polyamide (Y) in the polyamide resin composition) in a range of from 0.05 to 0.5, more preferably from 0.07 to 0.4, and further preferably from 0.1 to 0.3. In the case where the ratio is 0.05 or more, increase of the melt viscosity due to the phosphorus atom-containing compound can be suppressed, and in the case where the ratio is 0.5 or less, the polyamide (X) and the polyamide (Y) can be prevented from being hydrolyzed with the fatty acid salt and the additive (B) or being colored upon molding. The addition amount of the fatty acid metallic salt has been described above.

As having been described above, there are cases where a high melt viscosity far exceeding the arithmetic average is exhibited upon melt-mixing the polyamide (X) and the polyamide (Y). While the reason why the melt viscosity is greatly increased is not clear, such a phenomenon is not observed in the case where the amount of the phosphorus atom-containing compound in the polyamide resin composition is considerably small, and it is thus expected that amide exchange reaction proceeds between the polyamide (X) and the polyamide (Y) through the amidation catalytic effect of the phosphorus atom-containing compound, whereby a polyamide having a high molecular weight is produced. The fatty acid salt and the additive (B) also have a function of preventing the increase of the melt viscosity.

The phosphorus atom-containing compound has a function of preventing the polyamide (X) from being oxidized as having been described above, and for example, when the polyamide (X) having been stored for a certain period or the polyamide (X) having been exposed to the air is used as the resin component, the degree of increase of the melt viscosity sometimes varies even though the phosphorus atom concentration and the end group concentration are the same. It is considered that this is because the phosphorus atom-containing compound is reacted with oxygen to lose the catalytic effect to amidation reaction, and the effect of accelerating the amide exchange reaction upon mixing with the polyamide (Y) is gradually lost. However, by adding the fatty acid metallic salt and the arbitrary additive (B) in suitable amounts, a melt viscosity that is close to the arithmetic average calculated from the melt viscosities of the polyamide (X) and the polyamide (Y) can be realized irrespective of the storage state of the polyamide (X). The addition of the fatty acid metallic salt and the arbitrary additive (B) decreases the effect of the amount of the phosphorus atom-containing compound contained in the polyamide (X) and the polyamide (Y) and the end group concentration of the polyamides on the melt viscosity, and thus the polyamide resin composition can be produced by selecting the polyamide (X) and the polyamide (Y) having properties corresponding to the purpose without care of the end group concentration of the polyamides and the phosphorus atom concentration.

In the present invention, the additive (A) and the additive (B) are not particularly limited in shape, and preferably have a particle diameter of 0.2 mm or less since powder having a small particle diameter can be easily dispersed uniformly in the resin composition through dry mixing.

The resin component (the polyamide (X), or the polyamide (X) and the polyamide (Y)) can be mixed with the fatty acid metallic salt and the arbitrary additive (A) and/or the arbitrary additive (B) by a known method, and dry mixing is preferably performed since it is low in cost and does not apply thermal history. In the case where the resin component is a mixture of the polyamide (X) and the polyamide (Y), it is preferably added upon melt mixing. Examples of the dry mixing method include a method of placing the resin component, the fatty acid metallic salt and the arbitrary additive (A) and/or the arbitrary additive (B) in a tumbler, which is rotated for mixing them. Examples thereof also include a method of producing a master batch containing the polyamide (X), the polyamide (Y) and other thermoplastic resins kneaded with the fatty acid metallic salt and the arbitrary additive (A) and/or the arbitrary additive (B). The substrate of the master batch is preferably a thermoplastic resin that does not change the properties of the polyamide resin composition largely. The polyamide (X) or the polyamide (Y) is particularly preferably used as the substrate. However, in the case where the mixing amount of the master batch is not significantly large, the substrate may be selected from various thermoplastic resins without particular limitation. Furthermore, such a method may be employed that for preventing separation of the fatty acid metallic salt, the additive (A) and the additive (B) from the resin component, a viscous liquid is attached as a spreading agent to the resin component, and then the components are added and mixed. Examples of the spreading agent include a surfactant but are not limited thereto, and known products may be used.

The polyamide resin composition may contain one or plural kinds of other resins, such as a polyester resin, a polyolefin resin, a phenoxy resin and the like, in such a range that does not impair the objects of the invention. Furthermore, a fibrous inorganic filler, such as glass fibers, carbon fibers and the like; a tabular inorganic filler, such as glass flakes, talc, kaolin, mica, montmorillonite, organized clay and the like; an impact resistance improving agent, such as various kinds of elastomer and the like; a crystal nucleating agent; a lubricant, such as a fatty acid amide compound, a fatty acid metallic salt compound, a fatty acid amide compound and the like; an antioxidant, such as a copper compound, an organic or inorganic halogen compound, a hindered phenol compound, a hindered amine compound, a hydrazine compound, a sulfur compound, a phosphorus compound and the like; an additive, such as a heat stabilizer, a coloration preventing agent, an ultraviolet ray absorbent, e.g., a benzotriazole compound and the like, a releasing agent, a plasticizer, a colorant, a flame retardant and the like; and an additive, such as a compound containing metallic cobalt, which is a compound imparting oxygen scavenging capability, an alkali compound for preventing the polyamide from being gelled, and the like may be added.

The polyamide resin composition of the present invention can be applied to not only various packaging materials, such as a film, a sheet, a bottle and the like, but also various materials including a monofilament, a molding material and the like. Upon forming a packaging material, other thermoplastic resins, a metallic foil, a paperboard and the like may be used in combination. The polyamide resin composition of the present invention may be melt-mixed with other thermoplastic resins depending on necessity.

The polyamide resin composition of the present invention preferably has an oxygen transmission rate (OTR) of 0.2 cc·mm/(m$^2$·day·atm) or less, more preferably 0.15 cc·mm/(m$^2$·day·atm) or less, further preferably 0.10 cc·mm/(m$^2$·day·atm) or less, and particularly preferably 0.08 cc·mm/(m$^2$·day·atm) or less, in terms of an average value under conditions of a temperature of 23° C. and a relative humidity (RH) of 60%. A bottle having a barrier layer exhibiting such an OTR capability has a favorable gas barrier property, which prolongs the expiration period of the content stored.

Accordingly, a barrier layer of a multilayer structure is preferably formed with the polyamide resin composition of the present invention since it is good in gas barrier property, productivity, molding processability and transparency.

Examples of the multilayer structure include a multilayer film, a multilayer sheet, a multilayer bottle, a multilayer blown bottle and the like.

The multilayer structure is not particularly limited in production method, and known techniques may be used. For example, a film is formed by a co-extrusion method and then formed into various containers. Examples of the co-extrusion method include known methods, such as a T-die method, an inflation method and the like. A multilayer preform may be produced by injection molding, and then formed into a multilayer bottle by blow molding. In the case where the polyamide resin composition of the present invention is used as a barrier layer, in particular, high bubble entrainment prevention effect and whitening prevention effect are obtained upon producing the multilayer preform, thereby improving favorably the productivity and transparency.

In the production of the multilayer structure using the polyamide resin composition of the present invention as a barrier layer, a known screw, such as those for nylon or polyolefin, those of a slow compression type and a rapid compression type, those of a single flight type and a double flight type, and the like, may be used, and molding can be favorably performed without bubbles entrained with such a screw that has been said to be unsuitable for extruding MXD6.

The cylinder temperature, at which the polyamide resin composition of the present invention is extrusion-molded or injection-molded into a barrier layer, is preferably from 200 to 300° C., and more preferably from 210 to 290° C. The rotation number of the screw is preferably from 5 to 400 rpm, and more preferably from 10 to 250 rpm. The backpressure upon measuring for injection molding is preferably from 0 to 1,000 psi, and more preferably from 25 to 500 psi.

The multilayer structure of the present invention can be applied to a bag container, such as a bag sealed on four edges, a pillow bag, a standing pouch bag and the like, various packaging materials, such as a lid material for a container and the like, a bottle, and the like. A stretched film may be produced with the multilayer film as a raw material and formed into a container. The multilayer non-stretched film may be heat-molded into a container in a cup form. A multilayer structure may be produced by laminating with paper. The multilayer structure of the present invention can house and store various products. For example, it can house various products, such as a liquid beverage, a seasoning, a food in a paste form, a food in a liquid form, noodles, a processed rice product, a dairy product, a chemical agent in a solid form or a liquid form, a medical agent in a liquid form or a paste form, a cosmetic material, a hair-care product, a skin-care product, an electronic part and the like.

In particular, the multilayer structure of the present invention is suitable for a material of a packaging container housing a product having a high water activity, a packaging container exposed to a high humidity, and a packaging container subjected to thermal sterilization, such as retorting, boiling and the like.

The multilayer structure of the present invention has a layer (layer (2)) other than the barrier layer (layer (1)). The material for constituting the layer (2) is not particularly limited, and examples thereof include polyester, polyolefin, polyamide, polystyrene, paper and the like.

The layer (2) is preferably a layer constituted mainly with polyester. The polyester is preferably a thermoplastic polyester resin obtained through polymerization reaction of a dicarboxylic acid component containing terephthalic acid in an amount of 80% by mol or more, and preferably 90% by mol or more, and a diol component containing ethylene glycol in an amount of 80% by mol or more, and preferably 90% by mol or more (which is hereinafter referred to as a polyester (F)).

As the polyester (F), polyethylene terephthalate is preferably used. Polyethylene terephthalate is preferred since it exhibits excellent characteristics in transparency, mechanical strength, injection molding property, stretching blow-molding property and the like.

As the other dicarboxylic acid component than terephthalic acid in the polyester (F), isophthalic acid, diphenylether-4,4'-dicarboxylic acid, naphthalene-1,4 or 2,6-dicarboxylic acid, adipic acid, sebacic acid, decane-1,10-dicarboxylic acid and hexahydroterephthalic acid may be used. As the other diol component than ethylene glycol, propylene glycol, 1,4-butanediol, neopentyl glycol, diethylene glycol, cyclohexanedimethanol, 2,2-bis(4-hydroxyphenyl)propane, 2,2-bis(4-hydroxyethoxyphenyl)propane and the like may be used. Furthermore, an oxy acid, such as p-oxybenzoic acid and the like, may be used as a raw material monomer of the polyester (F).

The intrinsic viscosity of the polyester (F) is from 0.55 to 1.30, preferably from 0.65 to 1.20, and particularly preferably from 0.7 to 1.0 (solvent: mixed solvent phenol/tetrachloroethane=6/4, measurement temperature: 30° C.). In the case where the intrinsic viscosity is 0.55 or more, a multilayer preform can be obtained in a transparent amorphous state, and a multilayer bottle obtained has a satisfactory mechanical strength. In the case where the intrinsic viscosity is 1.30 or less, a bottle can be easily molded with flowability not lost upon molding.

The polyester (F) may contain other thermoplastic resins and various additives in such ranges that do not impair the advantages of the invention. Examples of the thermoplastic resin include a thermoplastic polyester resin, such as polyethylene 2,6-naphthalenedicarboxylate and the like, a polyolefin resin, polycarbonate, polyacrylonitrile, polyvinyl chloride, polystyrene and the like. Examples of the additive include an ultraviolet ray absorbent, an oxygen absorbent, a colorant, an infrared ray absorbent that accelerates heating of the preform to shorten the cycle time on molding (reheat additive) and the like.

A polyamide compound is preferably used in the layer (2), and an aliphatic polyamide is particularly preferably used since it provides good mechanical properties without impairing the appearance of the film. As the aliphatic polyamide resin, copolymers, such as nylon 6, nylon 66, nylon 46, nylon 610, nylon 612, nylon 11, nylon 12, nylon 666 and the like, may be used solely or in combination of plural kinds thereof. Among these, nylon 6, nylon 66 and nylon 666 are preferably used since they exhibit high effect of improving the mechanical properties of the film. The layer (2) is preferably a layer that is constituted mainly by an aliphatic polyamide.

In the layer (2), for example, various kinds of polyolefin materials are preferably used since the mechanical properties of the multilayer structure can be improved, such as a polyethylene material, such as low density polyethylene, medium density polyethylene, high density polyethylene and the like, a polypropylene material, such as a propylene homopolymer, a propylene-ethylene block copolymer, a propylene-ethylene random copolymer and the like, an ethylene-butene copolymer, an ethylene-hexene copolymer, an ethylene-octene copolymer, an ethylene-vinyl acetate copolymer, an ethylene-methyl methacrylate copolymer, a propylene-α-olefin copolymer, polybutene, polypentene, an ionomer resin and the like. The layer (2) is preferably a layer that is constituted mainly by a polyolefin material.

The layer (2) may contain, for further improving the mechanical properties, an impact resistance improving material, such as various kinds of elastomer and the like, and may contain additives, for example, a crystal nucleating agent, a lubricant, such as a fatty acid amide compound, a fatty acid metallic salt compound, a fatty acid amide compound and the like, an antioxidant, such as a copper compound, an organic or inorganic halogen compound, a hindered phenol compound, a hindered amine compound, a hydrazine compound, a sulfur compound, a phosphorus compound, e.g., sodium hypophosphite, potassium hypophosphite, calcium hypophosphite, magnesium hypophosphite and the like, a heat stabilizer, a coloration preventing agent, an ultraviolet ray absorbent, e.g., a benzotriazole compound and the like, a releasing agent, a plasticizer, a colorant, a flame retardant and the like, and may contain an inorganic pigment, such as titanium oxide and the like, and an organic pigment, such as a dye and the like.

The multilayer structure of the present invention may have an adhesive resin layer containing a modified polyolefin resin or the like laminated between the layers depending on necessity.

The multilayer structure of the present invention may have such a layer laminated thereon that functions as a sealant upon used as a packaging material, such as a pouch, a lid and the like. A thermoplastic resin capable of being used as the sealant is not particularly limited as far as it exhibits the function of sealant, and examples thereof include various kinds of polyolefin, for example, a polyethylene material, such as low density polyethylene, medium density polyethylene, high density polyethylene and the like, a polypropylene material, such as a propylene homopolymer, a propylene-ethylene block copolymer, a propylene-ethylene random copolymer and the like, an ethylene-butene copolymer, an ethylene-hexene copolymer, an ethylene-octene copolymer, an ethylene-vinyl acetate copolymer, an ethylene-methyl methacrylate copolymer, a propylene-α-olefin copolymer, polybutene, polypentene, an ionomer resin and the like, polystyrene, a polyester resin, such as polyethylene terephthalate and the like, a thermoplastic resin having easy-peeling property, and the like. The sealant layer may be a single layer containing the aforementioned resins or may have a multilayer structure having two or more layers. In the case of the multilayer structure, an adhesive resin layer containing a modified polyolefin resin or the like may be laminated between the resin layers depending on necessity.

The sealant layer may contain an impact resistance improving material, such as various kinds of elastomer and the like, and may contain additives, for example, a crystal nucleating agent, a lubricant, such as a fatty acid amide compound, a fatty acid metallic salt compound, a fatty acid amide compound and the like, an antioxidant, such as a copper compound, an organic or inorganic halogen compound, a hindered phenol compound, a hindered amine compound, a hydrazine compound, a sulfur compound, a phosphorus compound, e.g., sodium hypophosphite, potassium hypophosphite, calcium hypophosphite, magnesium hypophosphite and the like, a heat stabilizer, a coloration preventing agent, an ultraviolet ray absorbent, e.g., a benzotriazole compound and the like, a releasing agent, a plasticizer, a colorant, a flame retardant and the like, and may contain an inorganic pigment, such as titanium oxide and the like, and an organic pigment, such as a dye and the like, in such a range that does not impair the function as sealant.

For improving the mechanical property or enhancing the commercial value, the multilayer structure of the present invention may have a non-stretched or stretched film containing polyester, polyamide, polypropylene or the like laminated thereon by extrusion lamination, dry lamination or the like.

In the case where the polyamide resin composition of the present invention is used as a barrier layer of a multilayer bottle, growth of spherulite in the barrier layer can be suppressed to improve favorably the delamination resistance of the multilayer bottle. The multilayer bottle can be obtained by subjecting a multilayer preform, which is obtained, for example, with an injection molding machine having two injection cylinders by injecting the layer (2) forming material and the polyamide resin composition from the injection cylinders on the skin side and the core side respectively through a die hot runner into a die cavity, to biaxially stretching blow molding according to a known method.

In general, a multilayer preform is blow-molded by a known method including so-called a cold parison method, a hot parison method and the like. Examples of the method include a method, in which after heating a surface of a multilayer preform to 80 to 120° C., the preform is stretched in the axial direction with a mechanical measure, such as core rod insertion and the like, and then stretched in the transversal direction by blowing high-pressure air of generally from 2 to 4 MPa to attain blow molding, a method, in which a neck part of a multilayer preform is crystallized, and after heating the surface of the preform to 80 to 120° C., the preform is blow-molded in a mold at 90 to 150° C., and the like.

In the present invention, the heating temperature of the preform is preferably from 90 to 110° C., and more preferably from 95 to 108° C. In the case where the temperature is in the range, the multilayer preform can be favorably molded into a bottle. The surface temperature can be measured with an infrared radiation thermometer at a general emissivity of 0.95.

The weight of the multilayer preform is preferably from 15 to 50 g. It is preferably from 18 to 30 g for the preform for a bottle of about 500 mL, and is preferably from 15 to 25 g for the preform for a bottle of about 350 mL. In the case where the weight is in the range, the multilayer preform can be favorably molded into a bottle with good gas barrier property.

In the present invention, the multilayer bottle preferably has a three-layer structure including layer (2)/layer (1)/layer (2) or a five-layer structure including layer (2)/layer (1)/layer (2)/layer (1)/layer (2) owing to excellent barrier property and moldability.

A multilayer bottle having a three-layer structure or a five-layer structure can be obtained by subjecting a multilayer preform having a three-layer structure or a five-layer structure to biaxially stretching blow molding according to a known method. The cooling time for forming the multilayer preform is preferably 2 seconds or more, and more preferably 3 seconds or more. The temperature of cooling water is preferably 15° C. or less. The multilayer preform having a three-layer structure or a five-layer structure is not particularly limited in production method thereof, and a known method may be applied. For example, the layer (2) forming material constituting the innermost layer and the outermost layer is injected from the injection cylinder on the skin side, and the polyamide resin composition constituting the barrier layer (layer (1)) is injected from the injection cylinder on the core side, in which the layer (2) forming material is firstly injected, then the polyamide resin composition and the layer (2) forming material are simultaneously injected, and then the layer (2) forming material is injected in a necessary amount to fill the mold cavity, whereby the multilayer preform having a three-layer structure (layer (2)/layer (1)/layer (2)) can be produced.

The layer (2) forming material constituting the innermost layer and the outermost layer is injected from the injection cylinder on the skin side, and the polyamide resin composition constituting the barrier layer is injected from the injection cylinder on the core side, in which the layer (2) forming material is firstly injected, then the polyamide resin composition is solely injected, and then finally the layer (2) forming material is injected to fill the mold cavity, whereby the multilayer preform having a five-layer structure (layer (2)/layer (1)/layer (2)/layer (1)/layer (2)) can be produced. The method for producing the multilayer preform is not limited to the aforementioned methods.

In the multilayer bottle, the thickness of the layer (2) is preferably from 0.01 to 1.0 mm, and the thickness of the barrier layer (layer (1)) is preferably from 0.005 to 0.2 mm (from 5 to 200 μm). The thickness of the multilayer bottle may not be constant over the entire bottle, and is generally in a range of from 0.2 to 1.0 mm.

The weight of the barrier layer in the multilayer bottle is preferably from 1 to 20% by weight, more preferably from 2 to 15% by weight, and particularly preferably from 3 to 10% by weight, based on the total weight of the multilayer bottle. In the case where the weight of the barrier layer is in the range, a multilayer bottle having favorable gas barrier property can be obtained, and the multilayer preform as a precursor can be easily molded into the multilayer bottle.

The bottom part of the multilayer bottle preferably has a petaloid shape or a champagne shape.

In the multilayer bottle obtained by subjecting the multilayer preform to biaxially stretching blow molding, the gas barrier capability can be exhibited with the barrier layer that is present at least on the body part of the multilayer bottle, but higher gas barrier property can be obtained by extending the barrier layer to the vicinity of the end of the neck of the multilayer bottle. The stretching ratio on molding the preform into the bottle is generally about from 9 to 13 times.

In the present invention, the multilayer bottle may be heat-set (heat setting) in the blow molding die. The heat setting can be performed according to known conditions, and for example, the neck part of the multilayer preform is crystallized by infrared heating, and the heat setting can be performed at a temperature of the mold of preferably from 130 to 180° C., and more preferably from 145 to 165° C., for a period of preferably from 1 to 20 seconds, and more preferably from 3 to 10 seconds.

EXAMPLE

The present invention will be described in more detail with reference to examples and comparative examples below, but the present invention is not limited to the examples. The measurements in the examples were performed in the following manners.

(1) Relative Viscosity of Polyamide 1 g of a polyamide was precisely weighed and dissolved in 100 mL of 96% sulfuric acid at 20 to 30° C. under stirring. After completely dissolved, 5 mL of the solution was quickly placed in a Cannon-Fenske viscometer, and after placing in a thermostat chamber at 25° C. for 10 minutes, the drop time (t) was measured. 96% sulfuric acid itself was measured for the drop time (t0) in the same manner. The relative viscosity was calculated from t and t0 according to the following equation.

$$\text{Relative viscosity} = t/t0$$

(2) b* Value of Polyamide Pellets

The b* value was measured by a reflection method according to JIS K7105. A larger b* value means higher yellowness. As a measuring apparatus of the b* value, a color difference measuring apparatus (Model Z-Σ80 Color Measuring System), produced by Nippon Denshoku Industries Co., Ltd., was used.

(3) Gas Barrier Property

A film was measured for oxygen transmission rate and oxygen transmission coefficient according to ASTM D3985 under an atmosphere of 23° C. and 80% RH. The measurement was performed with OX-TRAN 2/16, produced by Modern Controls, Inc. A lower value means better gas barrier property. A bottle was measured for oxygen transmission rate according to ASTM D3985 under an atmosphere of 100% RH inside the bottle and 50% outside the bottle. The measurement was performed with OX-TRAN 2/16, produced by Modern Controls, Inc. A lower value means better gas barrier property.

(4) Productivity and Molding Processability

A multilayer preform or a multilayer film was produced with the resin composition as a barrier layer, and the number of bubbles formed in the barrier layer was measured to evaluate productivity and molding processability.

(5) Transparency

The barrier layer taken out from the multilayer preform was measured for haze according to JIS K7105 and ASTM D1003 with a haze value measuring apparatus (Model COH-300A), produced by Nippon Denshoku Industries Co., Ltd.

(6) Melt Viscosity of Polyamide

The melt viscosity was measured with Capilograph 1-D, produced by Toyo Seiki Seisaku-Sho, Ltd. by setting a capillary having a diameter or 1 mm and a length of 10 mm under conditions of 260° C. and a melt retention time of from 5 to 15 minutes.

Example 1

Melt Polymerization of Polyamide 15,000 g (102.6 mol) of precisely weighed adipic acid, 5.174 g (0.0488 mol) of sodium hypophosphite and 2.803 g (0.0342 mol) of sodium acetate were placed in a reaction vessel having an inner capacity of 50 L equipped with a stirrer, a partial condenser, a total condenser, a thermometer, a dropping funnel, a nitrogen introducing tube and strand die, and after sufficiently replaced with nitrogen, the contents were heated to 170° C. under stirring the system under a small amount of nitrogen stream. 13,974 g (102.6 mol) of m-xylylenediamine was added dropwise thereto under stirring, and the system was continuously increased in temperature while removing generated condensation water outside the system. After completing the dropwise addition of m-xylylenediamine, the inner temperature was set at 260° C., and the reaction was continued for 40 minutes. Thereafter, the system was pressurized with nitrogen, and the polymer was taken out through the strand die and formed into pellets, so as to provide about 24 kg of a polyamide.

Solid Phase Polymerization of Polyamide

Subsequently, the polyamide was charged in a tumbling dryer having a jacket equipped with a nitrogen introducing tube, a vacuum line, a vacuum pump and a thermocouple for measuring the inner temperature, and after sufficiently replacing the interior of the tumbling dryer with nitrogen having a purity of 99% by volume or more while rotating at a constant speed, the tumbling dryer was heated under the same nitrogen stream to heat the pellets to a temperature of 150° C. over about 150 minutes. The pressure in the system, at which the temperature of the pellets reached 150° C., was reduced to 1 torr or less. The temperature was further increased to heat the pellets to a temperature of 200° C. over about 70 minutes, and maintained at 200° C. for 30 minutes. Nitrogen of having a purity of 99% by volume or more was then introduced into the system, and the tumbling dryer was cooled with rotation maintained to provide a polyamide 1 having a relative viscosity of 2.6. The resulting polyamide 1 had a b* value of 1.1.

Preparation of Polyamide Resin Composition 3.9 g (0.0065 mol) of calcium stearate was then added to 20 kg of the polyamide 1, and mixed by stirring in a tumbler for 10 minutes to provide a polyamide resin composition 1.

Production of Film

The polyamide resin composition 1 was extruded at a discharge rate of 3 kg/h into a film form by using a uniaxial extruder of 25 mm in diameter, a film extruder having a head equipped with a 600-mesh filter and a T-die, a cooling roller, a fish-eye detector (Model GX70W), produced by Mamiya-OP Co., Ltd., and a wind-up device equipped with a winding device and the like, and the winding speed was controlled to form a film having a width of 15 cm and a thickness of 50μ. The film was fed between the camera and the light source of the fish-eye detector, and while winding with the wind-up apparatus, the number of fish-eyes (having a circle-equivalent diameter of 20μ or more) in the film having a width of 10 cm and a length of 50 m was counted at the time after lapsing 1 hour from the start of extrusion, whereby the number of fish-eyes per 1 m² was calculated. The extrusion operation was continued after counting fish-eyes, and the resin pressure at the head of the extruder was observed to confirm occurrence of change thereof. The coloration state of the resulting film was visually observed. The results are shown in Tables 1 to 3.

Example 2

The melt-polymerization and the solid phase polymerization were performed in the same manner as in Example 1 except that the amount of sodium hypophosphite was 12.953 g (0.1220 mol), and the amount of sodium acetate was 7.008 g (0.0854 mol) to provide a polyamide 2 having a relative viscosity of 2.6 and a b* value of −2.0. The period of time where the temperature of the pellets was maintained at 200° C. was 20 minutes.

7.6 g (0.0126 mol) of calcium stearate was then added to 20 kg of the polyamide 2, and mixed by stirring in a tumbler for 10 minutes to provide a polyamide resin composition 2, which was observed for the number of fish-eyes, the change in resin pressure and coloration state in the same manner as in Example 1. The results are shown in Tables 1 to 3.

Example 3

The melt-polymerization and the solid phase polymerization were performed in the same manner as in Example 1 except that the amount of sodium hypophosphite was 17.247 g (0.1627 mol), and the amount of sodium acetate was 9.344 g (0.1139 mol) to provide a polyamide 3 having a relative viscosity of 2.6 and a b* value of −3.7. The period of time where the temperature of the pellets was maintained at 200° C. was 20 minutes.

11.8 g (0.0194 mol) of calcium stearate was then added to 20 kg of the polyamide 3, and mixed by stirring in a tumbler for 10 minutes to provide a polyamide resin composition 3, which was observed for the number of fish-eyes, the change in resin pressure and coloration state in the same manner as in Example 1. The results are shown in Tables 1 to 3.

Example 4

The melt-polymerization and the solid phase polymerization were performed in the same manner as in Example 1 except that the amount of sodium hypophosphite was 25.871 g (0.2441 mol), and the amount of sodium acetate was 14.016 g (0.1709 mol) to provide a polyamide 4 having a relative viscosity of 2.6 and a b* value of −4.5. The period of time where the temperature of the pellets was maintained at 200° C. was 20 minutes.

18.8 g (0.0310 mol) of calcium stearate was then added to 20 kg of the polyamide 4, and mixed by stirring in a tumbler for 10 minutes to provide a polyamide resin composition 4, which was observed for the number of fish-eyes, the change in resin pressure and coloration state in the same manner as in Example 1. The results are shown in Tables 1 to 3.

Example 5

A polyamide resin composition 5 was obtained in the same manner as in Example 2 except that 3.5 g (0.0058 mol) of calcium stearate was added to 20 kg of a polyamide (polyamide 5) obtained through melt-polymerization and solid phase polymerization in the same manner as in Example 2, and was observed for the number of fish-eyes, the change in resin pressure and coloration state in the same manner as in Example 1. The results are shown in Tables 1 to 3.

Example 6

A polyamide resin composition 6 was obtained in the same manner as in Example 2 except that 17.1 g (0.0281 mol) of calcium stearate was added to 20 kg of a polyamide (polyamide 6) obtained through melt-polymerization and solid phase polymerization in the same manner as in Example 2, and was observed for the number of fish-eyes, the change in resin pressure and coloration state in the same manner as in Example 1. The results are shown in Tables 1 to 3.

Example 7

The melt-polymerization and the solid phase polymerization were performed in the same manner as in Example 3 except that the amount of sodium acetate was 8.009 g (0.0976 mol) to provide a polyamide 7 having a relative viscosity of 2.6 and a b* value of −3.8. The period of time where the temperature of the pellets was maintained at 200° C. was 18 minutes.

A polyamide resin composition 7 was then obtained in the same manner as in Example 3, and was observed for the number of fish-eyes, the change in resin pressure and coloration state in the same manner as in Example 1. The results are shown in Tables 1 to 3.

Example 8

The melt-polymerization and the solid phase polymerization were performed in the same manner as in Example 3 except that the amount of sodium acetate was 12.014 g (0.1465 mol) to provide a polyamide 8 having a relative viscosity of 2.6 and a b* value of −3.6. The period of time where the temperature of the pellets was maintained at 200° C. was 27 minutes.

A polyamide resin composition 8 was then obtained in the same manner as in Example 3, and was observed for the number of fish-eyes, the change in resin pressure and coloration state in the same manner as in Example 1. The results are shown in Tables 1 to 3.

Example 9

14,250 g (97.5 mol) of precisely weighed adipic acid, 850 g (5.1 mol) of isophthalic acid, 8.624 g (0.0814 mol) of sodium hypophosphite and 4.004 g (0.0488 mol) of sodium acetate were placed in a reaction vessel having an inner capacity of 50 L equipped with a stirrer, a partial condenser, a total condenser, a thermometer, a dropping funnel, a nitrogen introducing tube and a strand die, and after sufficiently replaced with nitrogen, the contents were heated to 170° C. under stirring the system under a small amount of nitrogen stream. 13,974 g (102.6 mol) of m-xylylenediamine was added dropwise thereto under stirring, and the system was continuously increased in temperature while removing generated condensation water outside the system. After completing the dropwise addition of m-xylylenediamine, the inner temperature was set at 260° C., and the reaction was continued for 40 minutes. Thereafter, the system was pressurized with nitrogen, and the polymer was taken out through the strand die and formed into pellets, so as to provide about 24 kg of a polyamide.

Subsequently, the polyamide was charged in a tumbling dryer having a jacket equipped with a nitrogen introducing tube, a vacuum line, a vacuum pump and a thermocouple for measuring the inner temperature, and after sufficiently replacing the interior of the tumbling dryer with nitrogen having a purity of 99% by volume or more while rotating at a constant speed, the tumbling dryer was heated under the same nitrogen stream to heat the pellets to a temperature of 150° C. over about 150 minutes. The pressure in the system, at which the temperature of the pellets reached 150° C., was reduced to 1 torr or less. The temperature was further increased to heat the pellets to a temperature of 200° C. over about 70 minutes, and maintained at 200° C. for 30 minutes. Nitrogen of having a purity of 99% by volume or more was then introduced into the system, and the tumbling dryer was cooled with rotation maintained to provide a polyamide 9 having a relative viscosity of 2.6. The resulting polyamide 9 had a b* value of 0.2.

3.9 g (0.0065 mol) of calcium stearate was then added to 20 kg of the polyamide 9, and mixed by stirring in a tumbler for 10 minutes to provide a polyamide resin composition 9. It was then observed for the number of fish-eyes, the change in resin pressure and coloration state in the same manner as in Example 1. The results are shown in Tables 1 to 3.

Example 10

The melt-polymerization and the solid phase polymerization were performed in the same manner as in Example 9 except that the amount of sodium hypophosphite was 12.953 g (0.1220 mol), and the amount of sodium acetate was 7.008 g (0.0854 mol) to provide a polyamide 10 having a relative viscosity of 2.6 and a b* value of −0.5. The period of time where the temperature of the pellets was maintained at 200° C. was 27 minutes.

7.6 g (0.0126 mol) of calcium stearate was then added to 20 kg of the polyamide 10, and mixed by stirring in a tumbler for 10 minutes to provide a polyamide resin composition 10, which was observed for the number of fish-eyes, the change in resin pressure and coloration state in the same manner as in Example 1. The results are shown in Tables 1 to 3.

Comparative Example 1

A film was produced in the same manner as in Example 1 except that calcium stearate was not added, and was observed for the number of fish-eyes, the change in resin pressure and coloration state in the same manner as in Example 1. The results are shown in Tables 1 to 3.

TABLE 1

|  | Molar ratio of polyamide forming monomers | Phosphorus atom concentration in polyamide (ppm) | Molar ratio to Na hypophosphite Na acetate | Molar ratio to Na hypophosphite Ca stearate |
|---|---|---|---|---|
| Example 1 | MXDA/AA = 100/100 | 60 | 0.70 | 0.16 |
| Example 2 | MXDA/AA = 100/100 | 150 | 0.70 | 0.13 |
| Example 3 | MXDA/AA = 100/100 | 200 | 0.70 | 0.15 |
| Example 4 | MXDA/AA = 100/100 | 300 | 0.70 | 0.16 |
| Example 5 | MXDA/AA = 100/100 | 150 | 0.70 | 0.06 |
| Example 6 | MXDA/AA = 100/100 | 150 | 0.70 | 0.29 |
| Example 7 | MXDA/AA = 100/100 | 200 | 0.60 | 0.15 |
| Example 8 | MXDA/AA = 100/100 | 200 | 0.90 | 0.15 |
| Example 9 | MXDA/AA/IA = 100/95/5 | 100 | 0.60 | 0.10 |
| Example 10 | MXDA/AA/IA = 100/95/5 | 150 | 0.70 | 0.13 |
| Comparative Example 1 | MXDA/AA = 100/100 | 60 | 0.70 | 0 |

MXDA: m-xylylenediamine
AA: adipic acid
IA: isophthalic acid

TABLE 2

|  | Retention time at 200° C. on solid phase polymerization (minute) | Relative viscosity of polyamide | b* value of polyamide |
|---|---|---|---|
| Example 1 | 30 | 2.6 | 1.1 |
| Example 2 | 20 | 2.6 | −2.0 |
| Example 3 | 20 | 2.6 | −3.7 |
| Example 4 | 20 | 2.6 | −4.5 |
| Example 5 | 20 | 2.6 | −2.0 |
| Example 6 | 20 | 2.6 | −2.0 |
| Example 7 | 18 | 2.6 | −3.8 |
| Example 8 | 27 | 2.6 | −3.6 |
| Example 9 | 30 | 2.6 | 0.2 |
| Example 10 | 27 | 2.6 | −0.5 |
| Comparative Example 1 | 30 | 2.6 | 1.1 |

TABLE 3

|  | Resin pressure upon production of film (MPa) Immediately after starting | After 3 hours | After 6 hours | Number of fish-eyes of film (per m²) | Coloration of film |
|---|---|---|---|---|---|
| Example 1 | 2.1 | 2.1 | 2.1 | 320 | none |
| Example 2 | 2.1 | 2.1 | 2.1 | 330 | none |
| Example 3 | 2.1 | 2.1 | 2.1 | 400 | none |
| Example 4 | 2.1 | 2.1 | 2.1 | 460 | none |
| Example 5 | 2.1 | 2.1 | 2.1 | 320 | none |
| Example 6 | 2.1 | 2.1 | 2.1 | 350 | none |
| Example 7 | 2.1 | 2.1 | 2.1 | 470 | none |
| Example 8 | 2.1 | 2.1 | 2.1 | 490 | none |
| Example 9 | 2.1 | 2.1 | 2.1 | 400 | none |
| Example 10 | 2.1 | 2.1 | 2.1 | 410 | none |
| Comparative Example 1 | 2.3 | 3.8 | 5.6 | 360 | none |

As shown in Examples 1 to 10, the polyamide resin compositions of the present invention suffered less coloration, contained small amounts of gel causing fish-eyes, and were stable in resin pressure upon extruding. In Comparative Example 1 having no calcium stearate added, the filter was clogged due to denaturation of sodium hypophosphite, and the time-lapse increase of the resin pressure was observed.

Example 11

99.963% by weight of poly-m-xylyleneadipamide (MX Nylon S6007, produced by Mitsubishi Gas Chemical Co., Inc.) as the polyamide (X), 0.03% by weight of calcium stearate (produced by Kanto Chemical Co., Inc.) as the fatty acid metallic salt, and 0.007% by weight of polyoxyethylene-sorbitan monolaurate (Nonion LT-221, produced by NOF Corporation, kinematic eddy viscosity: 330 mm²/s) as the additive (A) were dry-mixed with a tumbler for 15 minutes. A three-layer preform (27 g) containing polyester (F) layer/barrier layer/polyester (F) layer with the resulting resin composition as the barrier layer was produced by injection molding under the following conditions. In the following conditions, the temperature of the core side injection cylinder was high, the rotation number of the core side screw was high, and the backpressure of the core side screw was low, as compared to the ordinary conditions, whereby air was liable to be entrained to form a large amount of bubbles.

The preform was cooled and then subjected to biaxially stretching blow molding under heating to provide a multi-layer bottle. As the resin constituting the polyester (F) layer, polyethylene terephthalate (1101, produced by Invista, Inc.) having an intrinsic viscosity of 0.80 (measured with a mixed solvent of phenol/tetrachloroethylene=6/4 (volume ratio) at a measurement temperature of 30° C.) was used. The barrier layer suffered less fluctuation in thickness and had a uniform finish line with no disorder to provide a preform having a stable quality with favorable moldability. The weight of the barrier layer with respect to the total weight of the resulting multilayer bottle was 10% by weight. The resulting bottle had an oxygen transmission rate of 0.009 cc/bottle·day·atm, which showed favorable barrier property. The evaluation results are shown in Table 4.

Shape of Three-layer Preform

The total length was 88 mm, the outer diameter was 20 mm, the thickness was 4.2 mm, and the weight was 21 g. The three-layer preform was produced with an injection molding machine, produced by Husky-Kortec (four pieces molded at one time). The screw used was an ordinary full flight type.

Conditions of Molding Three-Layer Preform

Temperature of skin side injection cylinder: 285° C.
Temperature of core side injection cylinder: 280° C.
Temperature of resin path in mold: 280° C.
Temperature of mold cooling water: 15° C.
Rotation number of core side screw: 175 rpm
Back pressure of core side screw: 0 psi
Cooling time: shown in Table 4

Shape of Multilayer Bottle

The total length was 155 mm, the outer diameter was 65 mm, the capacity was 350 mL, the bottom shape was a champagne shape, and no dimple was formed on the body part. The biaxially stretching blow molding was carried out with a blow molding machine (Model EFB1000ET), produced by Frontier, Inc.

Conditions of Biaxially Stretching Blow Molding

Heating temperature of preform: 103° C.
Pressure of stretching rod: 0.5 MPa
Primary blow pressure: 1.0 MPa
Secondary blow pressure: 2.5 MPa
Primary blow delay time: 0.35 sec
Primary blow time: 0.28 sec
Secondary blow time: 2.0 sec Blow exhaust time: 0.6 sec
Mold temperature: 30° C.

Example 12

99.95% by weight of polyamide containing a diamine component containing m-xylylenediamine and a dicarboxylic acid component containing 95% by mol of adipic acid and 5% by mol of isophthalic acid (melting point: 233° C., half crystallization time: 59 s) as the polyamide (X), 0.04% by weight of calcium stearate (produced by Kanto Chemical Co., Inc.) as the fatty acid metallic salt, and 0.01% by weight of polyoxyethylenesorbitan monolaurate (Nonion LT-221, produced by NOF Corporation, kinematic eddy viscosity: 330 mm$^2$/s) as the additive (A) were dry-mixed with a tumbler for 25 minutes. A multilayer bottle having the resulting resin composition as a barrier layer was obtained in the same manner as in Example 11. The resulting bottle had an oxygen transmission rate of 0.008 cc/bottle·day·atm, which showed favorable barrier property. The evaluation results are shown in Table 4.

Example 13

99.98% by weight of polyamide containing a diamine component containing m-xylylenediamine and a dicarboxylic acid component containing 90% by mol of adipic acid and 10% by mol of isophthalic acid (melting point: 226° C., half crystallization time: 133 s) as the polyamide (X), 0.015% by weight of calcium stearate (produced by Kanto Chemical Co., Inc.) as the fatty acid metallic salt, and 0.005% by weight of polyoxyethylenesorbitan monolaurate (Nonion LT-221, produced by NOF Corporation, kinematic eddy viscosity: 330 mm$^2$/s) as the additive (A) were dry-mixed with a tumbler for 20 minutes. A multilayer bottle having the resulting resin composition as a barrier layer was obtained in the same manner as in Example 11. The resulting bottle had an oxygen transmission rate of 0.008 cc/bottle·day·atm, which showed favorable barrier property. The evaluation results are shown in Table 4.

Comparative Example 2

99.98% by weight of poly-m-xylyleneadipamide (MX Nylon S6007, produced by Mitsubishi Gas Chemical Co., Inc.) as the polyamide (X) and 0.02% by weight of ethylenebisstearylamide (Alflow H-50, produced by NOF Corporation) as the additive (A) were dry-mixed with a tumbler for 5 minutes. A multilayer bottle having the resulting resin composition as a barrier layer was obtained in the same manner as in Example 11.

The resulting bottle had an oxygen transmission rate of 0.009 cc/bottle·day·atm. The evaluation results are shown in Table 4.

Comparative Example 3

99.985% by weight of poly-m-xylyleneadipamide (MX Nylon S6007, produced by Mitsubishi Gas Chemical Co., Inc.) as the polyamide (X) and 0.015% by weight of polyoxyethylenesorbitan monolaurate (Nonion LT-221, produced by NOF Corporation, kinematic eddy viscosity: 330 mm$^2$/s) as the additive (A) were dry-mixed with a tumbler for 10 minutes. A multilayer bottle having the resulting resin composition as a barrier layer was obtained in the same manner as in Example 11. The resulting bottle had an oxygen transmission rate of 0.009 cc/bottle·day·atm. The evaluation results are shown in Table 4.

Comparative Example 4

A multilayer bottle was obtained in the same manner as in Example 11 except that the barrier layer was changed to poly-m-xylyleneadipamide (MX Nylon S6007, produced by Mitsubishi Gas Chemical Co., Inc.). The evaluation results are shown in Table 4.

TABLE 4

| | Example | | | Comparative Example | | |
|---|---|---|---|---|---|---|
| | 11 | 12 | 13 | 2 | 3 | 4 |
| Polyamide (X) | S6007 | IPA-5 | IPA-10 | S6007 | S6007 | S6007 |
| Fatty acid metallic salt | | | | | | |
| Ca-ST (ppm) | 300 | 400 | 150 | 0 | 0 | 0 |
| Additive (A) | | | | | | |
| EBS | 0 | 0 | 0 | 200 | 0 | 0 |
| LT-221 | 70 | 100 | 50 | 0 | 150 | 0 |
| Bubble forming rate (%) | 0 | 0 | 0 | 1.5 | 0.7 | 4.1 |
| Haze (%) | 3 | 2 | 2 | 5 | 4 | 10 |
| Cooling time (s) | 4 | 3 | 2 | 6 | 5 | 6 |

S6007: poly-m-xylyleneadipamide (MX Nylon S6007)
IPA-5: 5 mol %-isophthalic acid-modified poly-m-xylyleneadipamide
IPA-10: 10 mol %-isophthalic acid-modified poly-m-xylyleneadipamide
EBS: ethylenebisstearylamide
Ca-ST: calcium stearate
LT-221: polyoxyethylenesorbitan monolaurate (Nonion LT-221)

Example 14

By using a multilayer film producing apparatus having two extruders, a feed block, a T-die, a cooling roller and a wind-up device, nylon 6 (UBE1020B, a trade name, produced by Ube Industries, Ltd., which is hereinafter abbreviated as N6) and the resin composition obtained in Example 12 were co-extruded from the first extruder and the second extruder, respectively, to produce a multilayer film having two species in three layers having a layer structure of N6 layer (10 μm)/barrier layer (5 μm)/N6 layer (10 μm), to which an LLDPE film was then laminated thereto to produce a multilayer film having three species in four layers having a layer structure of LLDPE layer (20 μm)/N6 layer (10 μm)/barrier layer (5 μm)/N6 layer (10 μm). As a screw for the barrier layer, a full flight screw for polyolefin having a diameter (D) of 40 mm, L (screw length)/D=24, a feed part length of 8D, a compression part length of 8D, a metering part of 8D and a compression ratio of 2.46 was used. The oxygen transmission rate of the resulting film was 0.4 cc/m$^2$·day·atm, which showed favorable barrier property. The barrier layer in the film was uniform with less fluctuation in thickness, and a film having stable quality without bubbles was obtained with good productivity and moldability.

Example 15

A multilayer film was produced in the same manner as in Example 14 except that a full flight screw for nylon having a diameter (D) of 40 mm, L (screw length)/D=20, a feed part length of 8D, a compression part length of 4D, a metering part of 8D and a compression ratio of 3.96 was used as the screw for the barrier layer. The barrier layer in the film was uniform with less fluctuation in thickness, and a film having stable quality without bubbles was obtained with good productivity and moldability.

Example 16

A multilayer film was produced in the same manner as in Example 14 except that a double full flight screw having a diameter (D) of 40 mm, L (screw length)/D=25, a feed part length of 16D, a compression part length of 5D, a metering part of 4D and a compression ratio of 2.67 was used as the screw for the barrier layer. The barrier layer in the film was uniform with less fluctuation in thickness, and a film having stable quality without bubbles was obtained with good productivity and moldability.

As shown in Examples 11 to 16, even under molding conditions where air was liable to be entrained to form bubbles, the resin composition of the present invention can be formed into a molded article having good characteristics without change of the molding conditions. Furthermore, it did not entrain air with screws having various shapes. Accordingly, the resin composition of the invention was considerably good in productivity and moldability. It did not suffer whitening due to crystallization immediately after molding, and excellent transparency was obtained even with a short cooling time. It was also excellent in gas barrier property under a high humidity condition.

Example 17

A mixture of pellets containing 30% by weight of the polyamide resin composition 1 (produced in Example 1) and 70% by weight of nylon 6 (glade: 1030B, produced by Ube Industries, Ltd.) were agitated and mixed with a tumbler. The mixture was melt-mixed at 260° C. with a uniaxial extruder having a diameter of 30 mm to produce mixed pellets 1. The mixed pellets 1 were dried under reduced pressure to control the water content to 0.03%, and then were measured for melt viscosity.

Example 18

A mixture of pellets containing 30% by weight of the polyamide resin composition 2 (produced in Example 2) and 70% by weight of nylon 6 (glade: 1030B, produced by Ube Industries, Ltd.) were agitated and mixed with a tumbler. The mixture was melt-mixed at 260° C. with a uniaxial extruder having a diameter of 30 mm to produce mixed pellets 2. The mixed pellets 2 were dried under reduced pressure to control the water content to 0.03%, and then were measured for melt viscosity.

Comparative Example 5

A mixture of pellets containing 30% by weight of the polyamide 1 (produced in Example 1, containing no calcium stearate) and 70% by weight of nylon 6 (glade: 1030B, produced by Ube Industries, Ltd.) were agitated and mixed with a tumbler. The mixture was melt-mixed at 260° C. with a uniaxial extruder having a diameter of 30 mm to produce mixed pellets. The mixed pellets were dried under reduced pressure to control the water content to 0.03%, and then were measured for melt viscosity.

TABLE 5

| Melt retention time | Melt viscosity (Pa·s)/shear rate: 100 sec$^{-1}$ | |
| --- | --- | --- |
| | 5 minutes | 10 minutes |
| Nylon 6 | 1,550 | 1,550 |
| Polyamide 1 | 710 | 700 |
| Polyamide 2 | 700 | 690 |

TABLE 6

| | Melt viscosity (Pa·s)/shear rate: 100 sec$^{-1}$ | |
| --- | --- | --- |
| | 5 minutes* | 10 minutes* |
| Example 17 | | |
| Arithmetic average value (a) | 1,298 | 1,295 |
| Actual measurement value (b) | 1,340 | 1,330 |
| (b)/(a) | 1.03 | 1.03 |
| Example 18 | | |
| Arithmetic average value (a) | 1,295 | 1,292 |
| Actual measurement value (b) | 1,330 | 1,360 |
| (b)/(a) | 1.03 | 1.05 |
| Comparative Example 5 | | |
| Arithmetic average value (a) | 1,298 | 1,295 |
| Actual measurement value (b) | 1,580 | 1,720 |
| (b)/(a) | 1.22 | 1.33 |

*melt retention time

INDUSTRIAL APPLICABILITY

The polyamide resin composition of the present invention suffers less bubbling upon molding irrespective of molding conditions including screw shape, temperature, back pressure and the like, and can be applied to continuous molding process for a prolonged period of time to provide excellent productivity. A molded article suffering less coloration and gelation and is excellent in transparency and barrier property under a high humidity can be obtained irrespective of molding conditions including temperature, cooling time and the like. A multilayer structure containing the polyamide resin composition of the present invention is favorably applied to a package of foods, beverages, electronic parts and the like, and the present invention provides considerably high industrial value.

The invention claimed is:

1. A polyamide resin composition comprising:
  a resin component containing a polyamide (X) obtained through melt polycondensation of a diamine component containing 70% by mol or more of m-xylylenediamine and a dicarboxylic acid component containing 70% by mol or more of an α,ω-linear aliphatic dicarboxylic acid, and
  a fatty acid metallic salt having from 10 to 50 carbon atoms,
  wherein the polyamide (X) has been obtained through melt polycondensation of the diamine component and the dicarboxylic acid component in the presence of both a phosphorus atom-containing compound and an alkali metal compound (C),
  the polyamide (X) contains the phosphorus atom-containing compound in a concentration of from 50 to 400 ppm in terms of phosphorus atom, and has a ratio represented by an expression:

M1/M2

(in the expression, M1 represents the total molar number of the fatty acid metallic salt in the polyamide resin composition, and M2 represents the molar number of the phosphorus atom-containing compound in the polyamide resin composition) of from 0.05 to 0.5, and
  a ratio (molar number of the alkali metal compound (C))/(molar number of the phosphorus atom-containing compound) is from 0.5 to 1.

2. The polyamide resin composition as claimed in claim 1, wherein the polyamide (X) is a polyamide obtained through polycondensation of a diamine component containing 70% by mol or more of m-xylylenediamine and a dicarboxylic acid component containing 70% by mol or more of an α,ω-linear aliphatic dicarboxylic acid having from 4 to 20 carbon atoms and from 1 to 20% by mol of isophthalic acid.

3. The polyamide resin composition as claimed in claim 1, wherein the polyamide (X) has a b* value in a color difference test of JIS K7105 of 3 or less.

4. The polyamide resin composition as claimed in claim 1, wherein the fatty acid metallic salt is a stearic acid metallic salt.

5. The polyamide resin composition as claimed in claim 1, wherein the resin component contains from 1 to 99% by weight of the polyamide (X) and from 99 to 1% by weight of a polyamide (Y) other than the polyamide (X) (provided that a total amount of the polyamide (X) and the polyamide (Y) is 100% by weight), and
wherein the polyamide (X) contains the phosphorus atom-containing compound in a concentration of from 50 to 400 ppm in terms of phosphorus atom, and has a ratio represented by an expression:

$$M3/M4$$

(in the expression, M3 represents a total molar number of the fatty acid metallic salt in the polyamide resin composition, and M4 represents a total molar number of the phosphorus atom-containing compound used in the polycondensation for producing the polyamide (X) and the phosphorus atom-containing compound used in the polycondensation for producing the polyamide (Y) in the polyamide resin composition) of from 0.05 to 0.5, and
a ratio (molar number of the alkali metal compound (C))/(molar number of the phosphorus atom-containing compound) is from 0.5 to 1.

6. The polyamide resin composition as claimed in claim 5, wherein the composition has a melt viscosity at 270° C., and a shear rate of 100 s$^{-1}$, of 1.20 times an arithmetic average value or less than 1.20 times the arithmetic average value, where the arithmetic average value is obtained by the following expression (1):

$$MVA=MV1/(W1/100)+MV2/(W2/100) \quad (1)$$

(in the expression, MVA represents the arithmetic average value of the melt viscosity (Pa·s);
MV1 represents the melt viscosity (Pa·s) of the polyamide (X) at 270° C. and a shear rate of 100 s$^{-1}$;
MV2 represents the melt viscosity (Pa·s) of the polyamide (Y) at 270° C. and a shear rate of 100 s$^{-1}$;
W1 represents the weight ratio (% by weight) of the polyamide (X) in the polyamide resin composition; and
W2 represents the weight ratio (% by weight) of the polyamide (Y) in the polyamide resin composition).

7. The polyamide resin composition as claimed in claim 5, wherein the polyamide (X) has a b* value in a color difference test of JIS K7105 of 3 or less.

8. The polyamide resin composition as claimed in claim 5, wherein the fatty acid metallic salt is a stearic acid metallic salt.

9. The polyamide resin composition as claimed in claim 5, wherein the polyamide (Y) does not contain a m-xylylenediamine unit.

10. The polyamide resin composition as claimed in claim 5, wherein the polyamide (Y) is selected from an aliphatic polyamide and a non-crystalline semi-aromatic polyamide.

11. A multilayer structure comprising a barrier layer comprising the resin composition as claimed in claim 1.

12. The multilayer structure as claimed in claim 11, wherein the structure further comprises a layer mainly comprising a polyester.

13. The multilayer structure as claimed in claim 11, wherein the structure further comprises a layer mainly comprising a polyolefin.

14. The multilayer structure as claimed in claim 11, wherein the structure further comprises a layer mainly comprising an aliphatic polyamide.

15. The multilayer structure as claimed in claim 12, wherein the polyester is a thermoplastic polyester resin obtained through polymerization reaction of a dicarboxylic acid component containing terephthalic acid in an amount of 80% by mol or more, and a diol component containing ethylene glycol in an amount of 80% by mol or more.

16. The multilayer structure as claimed in claim 15, wherein the structure is a multilayer bottle having a three-layer structure including polyester layer/barrier layer/polyester layer.

17. The multilayer structure as claimed in claim 15, wherein the structure is a multilayer bottle having a five-layer structure including polyester layer/barrier layer/polyester layer/barrier layer/polyester layer.

18. The multilayer structure as claimed in claim 11, wherein a weight of the barrier layer is from 1 to 20% by weight based on the total weight of the multilayer structure.

19. A structure comprising at least one layer comprising the polyamide resin composition as claimed in claim 5.

20. The polyamide resin composition as claimed in claim 1, wherein said fatty acid metallic salt is calcium stearate.

21. The polyamide resin composition as claimed in claim 1, wherein said fatty acid metallic salt is included in the polyamide resin composition in an amount of 50 to 5,000 ppm.

22. The polyamide resin composition as claimed in claim 1, wherein said phosphorus atom-containing compound is a metallic hypophosphite salt.

23. The polyamide resin composition as claimed in claim 22, wherein said metallic hypophosphite salt is sodium hypophosphite.

24. The polyamide resin composition as claimed in claim 1, wherein the polyamide (X) contains the phosphorus atom-containing compound in a concentration of from 70 to 300 ppm, and the ratio (molar number of the alkali metal compound (C))/(molar number of the phosphorus atom-containing compound) is from 0.6 to 0.9.

* * * * *